United States Patent [19]

Matsumiya et al.

[11] Patent Number: 5,093,546
[45] Date of Patent: Mar. 3, 1992

[54] METHOD OF CONNECTING PLASTIC TUBES USING HIGH FREQUENCY DIELECTRIC HEATING

[75] Inventors: Toshiharu Matsumiya, Shinnanyo; Tatsuhiko Kawaoka, Takatsuki; Kazuo Sakamoto, Shinnanyo; Hiroshi Ogawara, Ohtsu; Shozo Shiraishi, Osaka; Hiroshi Honda, Shinnanyo, all of Japan

[73] Assignee: Sekisui Kagaku Kogyo Kabushiki Kaisha, Osaka, Japan

[21] Appl. No.: 468,476

[22] Filed: Jan. 19, 1990

[30] Foreign Application Priority Data

Jan. 20, 1989 [JP] Japan .................................. 1-12826

[51] Int. Cl.⁵ .............................................. H05B 6/54
[52] U.S. Cl. .................................. 219/10.41; 219/10.53; 219/10.81; 156/274.4; 285/41
[58] Field of Search ............... 219/10.41, 10.43, 10.81, 219/8.5, 10.53; 285/41, 381, 382; 264/25, 26; 156/272.2, 273.7, 274.4

[56] References Cited

U.S. PATENT DOCUMENTS

| | | | |
|---|---|---|---|
| 2,498,383 | 2/1950 | Story | 219/10.81 |
| 3,327,086 | 6/1967 | Cable | 219/10.81 |
| 3,959,058 | 5/1976 | Rath et al. | 219/10.81 |
| 4,210,479 | 7/1980 | Fabisiewicz | 219/10.81 |
| 4,954,678 | 9/1990 | Harmony et al. | 219/10.43 |

FOREIGN PATENT DOCUMENTS

| | | | |
|---|---|---|---|
| 59-42920 | 3/1984 | Japan . | |
| 59-42921 | 3/1984 | Japan . | |
| 59-178214 | 10/1984 | Japan . | |
| 59-232820 | 12/1984 | Japan . | |
| 2-61381 | 12/1990 | Japan . | |
| 265794 | 3/1950 | Switzerland | 219/10.81 |

Primary Examiner—Philip H. Leung
Attorney, Agent, or Firm—Armstrong, Nikaido, Marmelstein, Kubovcik & Murray

[57] ABSTRACT

A method of connecting plastic tubes by high-frequency heating comprising preparing an electrode block having at least two electrode members each having annular bores aligned with each other, the electrode block including at least one insulator interposed between the electrode members, the insulator having a bore aligned with those of the electrode members, inserting an end portion of one tube into the one electrode member and an end portion of the other tube into another electrode member so that both tube ends keep contact with each other in the bore of the insulator, and applying a high frequency voltage between the electrode members.

2 Claims, 2 Drawing Sheets

METHOD OF CONNECTING PLASTIC TUBES USING HIGH FREQUENCY DIELECTRIC HEATING

BACKGROUND OF THE INVENTION

1. Field of the Invention

The present invention relates to a method of connecting plastic tubes by high-frequency heating, and more particularly to a method of connecting plastic tubes by high-frequency heating so as to ensure a long, continuous conduit. The conduits are particularly adapted for medical applications where no hygienic problems are permitted.

2. Description of the Prior Art

To effect the connection between flexible plastic tubes or pipes such as those of polyvinyl chloride, there are at least three methods; one is a method of using an adhesive, another is a method of utilizing the fusible nature of the plastic tubes, commonly called the "thermal sealing method", and the third one is a method of high-frequency heat. The adhesive method is self-explanatory. The thermal sealing method consists of fusing the tube ends to be joined under pressure so as to ensure the joint therebetween. A typical example of the high-frequency heating method is disclosed in Japanese Laid-Open Patent Publication No. 59-178214. This high-frequency heating method consists of abutting tube ends to be joined within a cylindrical outer electrode with an inner electrode being inserted in the tubes, and then applying a high frequency voltage between the inner and outer electrodes. The tube ends fuse and become joined. There is another method of combining the adhesive method and the fusion joint method.

A disadvantage of the adhesive method is that organic solvents such as tetrahydrofuran and cyclohexanon contained in the adhesive are likely to remain in the joined tube ends and harm patients' health when the tubes are used for medical treatments such as flood transfusion and catheters. A transfusion bag is legally prohibited from containing an adhesive. For medical applications the adhesive method must be avoided because of hygienic considerations.

A disadvantage of the heat sealing method is that the surface of flexible tube are likely to become carbonized before it reach a fusible temperature. This makes the tubes difficult to use in catheters. In addition, the joint strength is not sufficient.

The high-frequency heating method described above has the following disadvantages:

One is a hygienic problem. As described above, the inner electrode is inserted into the tubes, which is likely to introduce germs and/or dirt into the tubes and unhygienically contaminate the insides thereof. Another disadvantage is that the inner electrode must be manually inserted, which consumes labor and time. A further disadvantage is that the tube ends may contract and tightly constrict around the surface of the inner electrode to such an extent that the interfacial adhesion prevents the inner electrode from being pulled out of the tubes. This also consumes time and labor before the electrode is withdrawn from the tubes. A still further disadvantage is that this method can be only applicable when the tubes are open at both ends. If the tubes are closed at one end, the inner electrode would be confined in the conduit and could not be extracted therefrom. The applicability of the method is limited.

There is another high-frequency heating method, which is disclosed in Japanese Laid-Open Patent Publication No. 59-232820. This prior method is designed to join plastic plates. According to this method, plastic plates are overlaid in their end portions, and a pair of electrodes are placed on one of the plates, most often on the upper plate. An insulator is disposed between the two electrodes. A high-frequency voltage is applied between the electrodes. If this method is applicable to the joining of tubes, it would be advantageous in (1) that an unhygienic condition is unlikely to occur, (2) that the bother of inserting an inner electrode into the tubes is eliminated, and (3) that the method can be applied to any type of tube whether they may be closed at both ends or not. However, when tubes are to be joined by this method, it is unavoidable that the tubes be rotated so as to ensure the peripheral fusion joint. The rotation of tubes requires the provision of a rotor, which increases the production cost and prolongs the operation time. Nevertheless, it is likely that the joint would be incomplete.

SUMMARY OF THE INVENTION

Accordingly, an object of the present invention is to provide a method of connecting plastic tubes without causing any unhygienic condition.

Another object of the present invention is to provide a method of connecting plastic tubes firmly and with less labor and time.

According to one aspect of the invention there is provided a method of connecting plastic tubes by high-frequency heating, the method comprising the steps of preparing an electrode block having a first electrode member and a second electrode member each having annular operation bores aligned so as to communicate with each other, the electrode block including an insulator interposed between the first and the second electrode members, the insulator having a bore aligned with the bores of the first and second electrode members, inserting an end portion of one tube into the bore of the first member and an end portion of the other tube into the second member so that both tube ends are placed in contact with each other in the annular operation bores and applying a high frequency voltage between the first and second electrode members.

According to another aspect of the present invention, the electrode block comprises a third electrode member between the first electrode member and the second electrode member, and a further insulator so that the adjacent electrode members have one insulator therebetween, the third electrode member having a bore aligned with the bores of the first and second electrode members.

Other objects and advantages of the present invention will become more apparent from the detailed description given hereinafter; it should be understood, however, that the detailed description and specific embodiment are given by way of illustration only, since various changes and modifications within the spirit and scope of the invention will become apparent to those skilled in the art from this detailed description.

Thus, the joint between tubes is firm and safe from contamination from germs and dirt, particularly with an organic solvent. As a result, the conduits obtained according to the present invention are particularly adapted for use in medical treatment and medical appliances. In carrying out the method, the bother of manually inserting and withdrawing the electrode is eliminated, thereby avoiding the consumption of time and labor.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
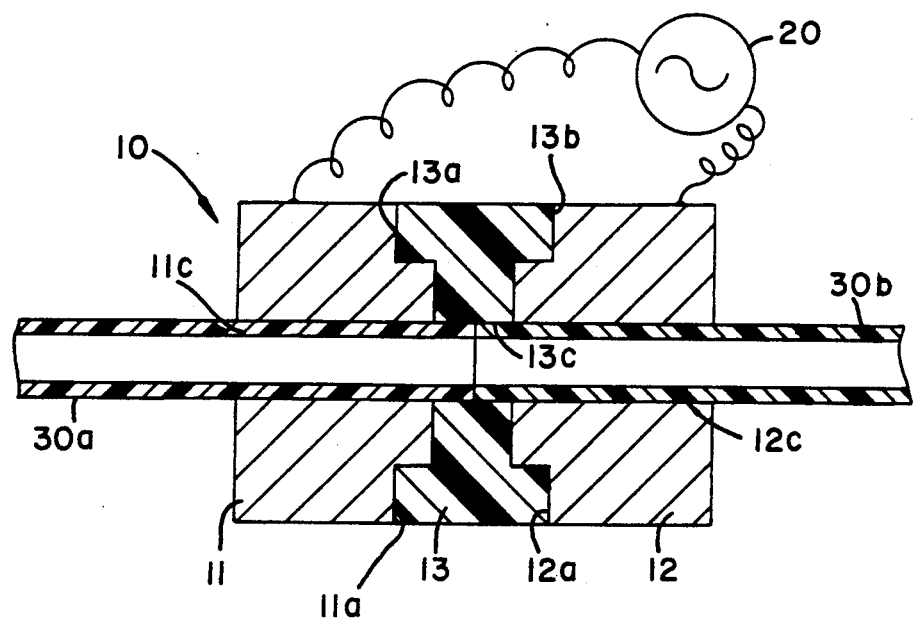
FIG. 1 is a sectional view showing an example of the embodiment according to the present invention.

Referring to FIG. 1 there is provided a electrode block 10 which includes a first electrode member 11 and a second electrode member 12. The electrode members 11 and 12 have the same diameter, and are made of the same electrode material. The electrode members 11 and 12 have annular operation bores 11c and 12c, respectively. The two bores 11c and 12c are aligned so as to communicate with each other. The bores 11c and 12c accommodate tube ends in their butting posture. The reference numeral 13 denotes an insulator interposed between the first and second electrode members 11 and 12. In order to position the insulator 13 and the electrode members 11 and 12 in their proper relative positions the first and the second electrode members 11 and 12 are respectively provided with recesses 11a and 12a, and the insulator 13 is provided with projections 13a and 13b so that the projections 13a, 13b fit into the corresponding recesses 11a and 12a to ensure a firm joint between the insulator 13 and the electrode members 11, 12.

Figure 2:
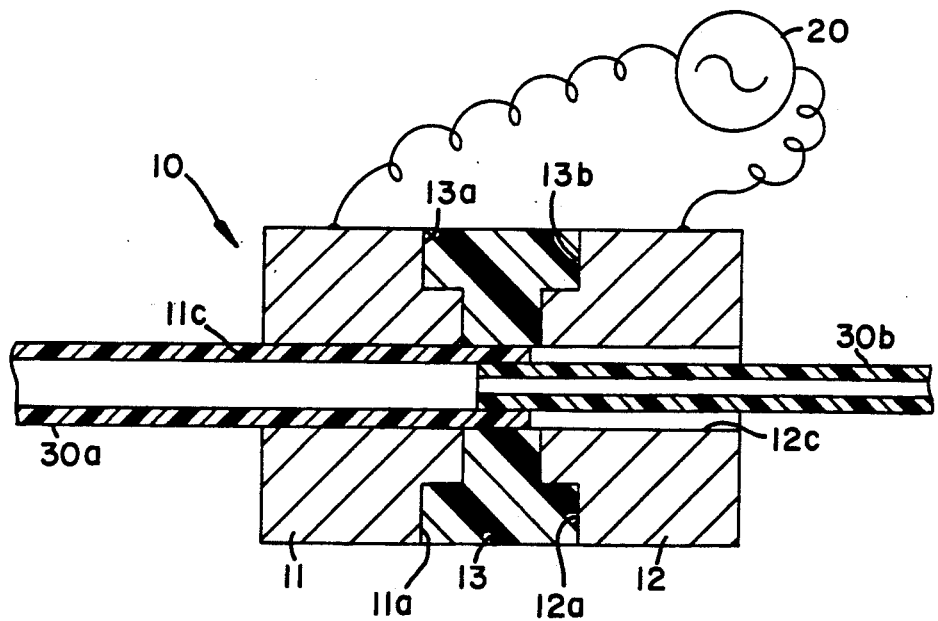
FIGS. 2 to 4 are sectional views showing various modified examples of the embodiment.

The insulator 13 has a bore 13c which is aligned with the annular operation bores 11c and 12c of the first and second electrode members 11 and 12. Tubes 30a and 30b are inserted into the bores 11c, 12c and 13c in which the ends of the tubes 30a and 30b are placed in abutment with each other as shown in FIG. 1 or overlaid in their joining end portions as shown in FIG. 2.

The insulator 13 is made of a material having a larger specific dielectric constant than that of the tubes to be joined. In addition, it is preferred that the insulator material has such a high melting point as to be safe from deformation at an elevated temperature, and is not likely to contaminate the tubes with germs and/or dirt. For example, when the tubes are made of flexible polyvinyl chloride, polytetrafluorethylene such as Tefron (trade mark) can be used. The surface area of the bore 13c affects the intensity of the electric field between the first electrode member 11 and the second electrode member 12. If the surface area of the bore 13c is excessively large as compared with the high-frequency output, the electric field becomes less intense. If the surface area of the bore 13c is excessively small, the heat cannot reach a wide range of tubes 30a and 30b. The ratio of the surface area of the bore 13c to the high-frequency output is normally set to about 20 to 0.1 $cm^2/kW$; preferably 10 to 0.1 $cm^2/kW$, and more preferably 3.0 to 0.1 $cm^2/kW$.

The electrode members 11, 12 (FIGS. 1 and 2) and 14, 15 and 16 (FIGS. 3 and 4) and the insulators 13 (FIGS. 1 and 2) and 17 and 18 (FIGS. 3 and 4) can be an annular one-piece body or alternatively, can be composed of two or more spilt body members.

There is provided an all-purpose high-frequency power source 20 connected between the electrode members 11 and 12, the power source 20 having a high-frequency oscillator tube. The output and the oscillating frequency are determined in accordance with the material and dimension of the plastic tubes to be joined so that the tubes are adequately heated.

The method described above is carried out in the following manner:

Referring to FIG. 1, the tubes 30a and 30b are inserted into the bores 11c and 12c of the electrode members 11 and 12 until the tube ends come into abutment with each other within the bore 13c of the insulator 13. It is preferred that the abutting tube ends keep contact with the inside surface of the bore 13c. Then the power source 20 is turned on to apply a high-frequency voltage between the electrode members 11a and 12a. A high-frequency alternating electric field is established along the annular body and the bore 13c of the insulator 13. The high-frequency alternating electric field established in the bore 13c is stronger toward the outer periphery of the annular body of the insulator 13 to such an extent as to be equal to the intensity of electric field passing through the insulator 13. The tubes 30a and 30b are exposed to the intensified high-frequency electric field, which is subject to an appropriate adjustment of the frequency and output of high-frequency voltage in accordance with the given conditions such as the nature of the tube material and size of the tubes. The ends of the tubes 30a and 30b are subjected to induction heating and becomes fusibly joined to each other. When a softening temperature is reached, the power source 20 is turned off. The joined tube ends are allowed to cool until their joint becomes firm. The connected tubes are then pulled out of the electrode block 10.

As is evident from the foregoing description, the tubes are sufficiently heated by induction heat without causing a carbonizing problem, thereby ensuring a strong and firm joint between the tubes. It is not necessary to employ an outer electrode and an inner electrode and to insert the inner electrode into the tubes at the risk of unhygienic contamination of the tubes. It is also advantageous in that there is no problem of the tubes contracting and constricting over the electrode thereby preventing the electrode from being pulled out of the tubes owing to interfacial adhesion between the tubes and the electrode.

FIG. 2 shows a modified version in which the tubes 30a and 30b are placed in a telescopic manner at their ends. A high-frequency voltage is applied between the electrode members 11 and 12 so that the peripheral portions of both tube ends are fused and joined.

Figure 3:
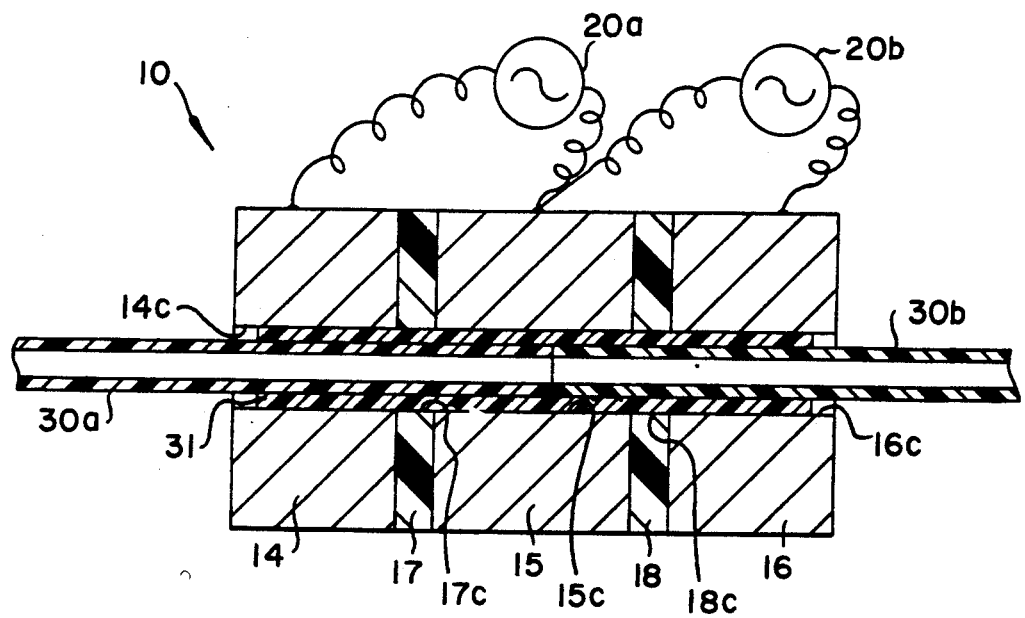

FIG. 3 shows a further modified version characterized by the provision of three electrode members 14, 15 and 16 with the interposition of two insulators 17 and 18. As described above, the three electrode members 14, 15 and 16 are coaxially arranged so as to enable their bores 14c, 15c and 16c to communicate with one another. This embodiment is adapted for joining three tubes 30a, 30b and 31. The third tube 31 strengthens the joint between the tubes 30a and 30b, and further ensures a watertight joint. The reference numerals 20a and 20b denote power sources. As a procedure the third tube 31 is placed to mantle the abutting two tubes 30a and 30b, and the mantled tubes are inserted into the electrode block 10 until the abutting tube ends position within the middle electrode member 15. At this stage a high-frequency voltage is applied by the power source 20a for a given period of time, and then by the other power source 20b. The power sources 20a and 20b can be combined into a single unit which is turned on and off by a switch, or alternatively, the two power sources can be simultaneously operated.

The operation of the power source 20a enables the tube 30a and the third tube 31 to fusibly join in their contacting parts, and the operation of the power source 20b enables the tube 30b and the third tube 31 to fusibly join in their contacting parts.

Figure 4:
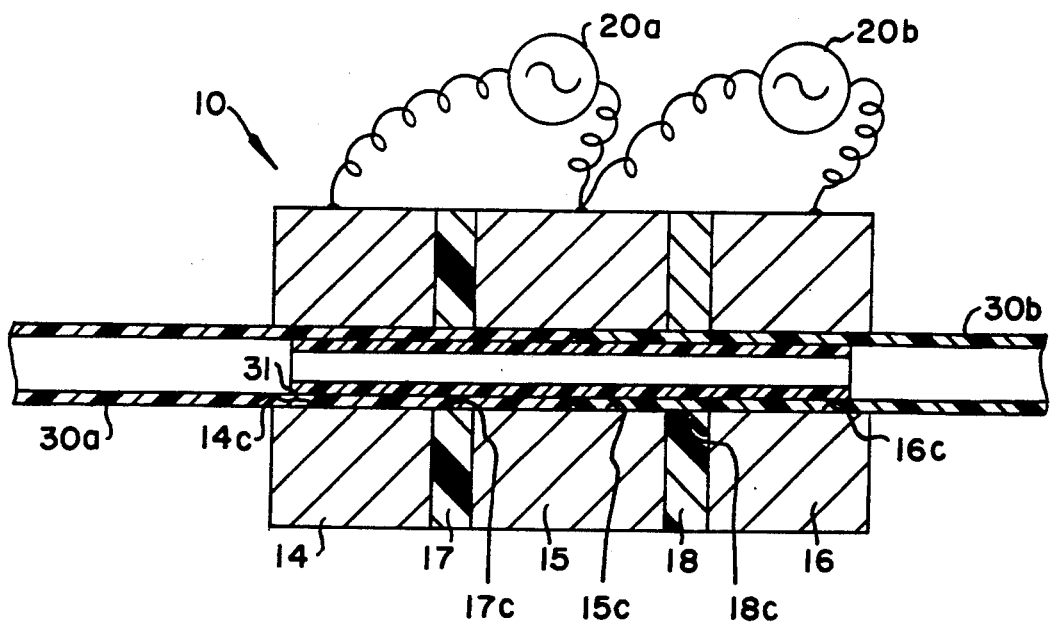

FIG. 4 shows an embodiment in which the third tube 31 is inserted into the tubes 30a and 30b. The fusion joint among the tubes 30a, 30b and 31 is effected in the same manner.

An example of carrying out the method by use of the arrangement of FIG. 3 will be described:

The electrode block 10 included annular electrode members 14, 15 and 16 of copper, having an outside diameter of 30 mm, an inside diameter of 6 mm and a length of 30 mm. Annular insulators 17 and 18 were disposed between the electrode members 14 and 15, and between the electrode members 15 and 16, respectively. The insulators 17 and 18 were made of Teflon, having an outside diameter of 30 mm, an inside diameter of 6.0 mm and a length of 5.0 mm. The insulators 17 and 18 were arranged coaxially of the electrode members 14, 15 and 16.

Tubes 30a and 30b of flexible polyvinyl chloride (Shore (A) Hardness at 20° C.: 80) having an outside diameter of 4.0 mm, an inside diameter of 2.0 mm and a length of 3.0 m, were inserted in a covering tube 31 of the same material, having an outside diameter of 6.0 mm, an inside diameter of 4.0 mm and a length of 80 mm. The electrode members 14, 15 and 16, and the insulators 17 and 18 had bores 14c, 15c, 16c and 17c and 18c, respectively, and were coaxially arranged so that the bores 14c to 18c communicated with one another. The tubes 30a and 30b were placed into abutment with each other at a middle point of the covering tube 31. The tubes 30a, 30b mantled by the covering tube 31 were placed in the bores 14c to 18c. At this stage the power sources 20a and 20b were turned on and a high-frequency voltage of 40.46 MHZ was applied for four seconds. As a result, the tubes 30a and 30b were joined to the covering tube 31 over a distance of about 17.5 mm from the respective open ends. In this way the tubes 30a and 30b were connected to each other into a conduit. The high-frequency oscillator incorporated in the power sources 20a and 20b had an output of 3 KW.

The joined tubes 30a and 30b, hereinafter referred to as conduit, had a good appearance. The conduit was sterilized by high pressure steam (121° C.×20 min) and then was subjected to a tensile test (the pulling speed: 200 mm/min). A fracture in the conduit was found under a load of about 1.8 kg/mm². The conduit was ascertained to have sufficient joints between the tubes. Sixty ml of clean water was confined in the conduit, and was allowed to stand for 24 hours at a room temperature. Then the number of impurities in dispersion therein was counted. To carry out the test, the procedure followed the prescriptions set for plastic containers for transfusion by the Authority of the Japan Pharmacopoeia. The instrument employed was an automatic counter of a light shuttering type. The results are shown in Table 1. It will be appreciated from Table 1 that the number of dispersed impurities is not different from that measured before the water was put in the conduit. The results show that the inside of the conduit was kept hygienic with no contamination.

Another test was conducted by confining 60 ml of distilled water used for injection and fusibly sealing both open ends of the conduit. The distilled water was prepared in accordance with the Japan Pharmacopoeia Prescriptions. The conduit containing the water was subjected to a sterizing treatment by a high pressure steam of 121° C. for 20 min. Then the water was examined by a high velocity liquid chromatography to see the amount of tetrahydrofuran (THF) content. The results are shown in Table 2. It will be noted from Table 2 that the amount of tetrahydrofuran did not differ between the before and after tests. Non-presence of detrimental organic solvent was also ascertained.

TABLE 1

| Impurities size | Fine particles (number/ml) | | |
|---|---|---|---|
| | The invention | Comparative method I | Prior to test |
| 1 μm < | 0.7 | 86.5 | 0.6 |
| 2 μm < | 0.2 | 45.3 | 0.2 |
| 5 μm < | 0 | 22.1 | 0 |
| 10 μm < | 0 | 10.5 | 0 |
| 25 μm < | 0 | 6.7 | 0 |
| 50 μm < | 0 | 4.2 | 0 |

TABLE 2

| Specimen No. | Tetrahydrofuran content (ppm) | | |
|---|---|---|---|
| | The invention | Comparative method II | Prior to test |
| 1 | 3 | 152 | 4 |
| 2 | 1 | 230 | 3 |
| 3 | 5 | 98 | 5 |

For comparison, the known methods described above were also tested:

When the tubes made of the same material were joined by the thermal sealing method, it was found that the conduit fractured at the joint under a load of 0.8 to 1.0 kg. The high-frequency heating method employing the inner electrode was tested in the following manner:

After a stainless electrode having an outside diameter of 2 mm was inserted into a first tube having an outside diameter of 4 mm and an inside diameter of 2 mm, a second tube having an outside diameter of 6 mm and an inside diameter of 4 mm was connected to the first tube in an overlaying state over a length of 10 mm. The overlaid parts of the first and second tubes were placed within an annular electrode block of copper having an outside diameter of 6 mm and were fusibly joined by high-frequency heating. The applied high-frequency was 40 MHZ and the application of voltage continued for four seconds. The overlapping parts of 10 mm were joined. The tests were conducted by the same procedure as that adopted to test the present invention, and the tensile strength and the degree of contamination were likewise examined. As shown in Table 1, the insides of the tubes are found remarkably contaminated as compared with the results of the present invention. The joining operation took a longer time by a few seconds than under the present invention. After the open ends of the tubes were sealed with tetrahydrofuran and the test conduit was allowed to stand for 24 hours, as Table 2 indicates, a considerable amount of organic solvent was present.

The method of the present invention is particularly adapted for making conduits used in transfusion bags, blood bags, bags for continuous ambulatory peritoneum dialysis (CAPD) but the method of the present invention can be used for any other use, for example, the connection of tube and infusion bag nozzle, tube catheter and infusion bag nozzle, infusion bag and nozzle in which highly hygienic considerations are required.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of connecting plastic tubes by high-frequency heating, comprising the steps of:

preparing an electrode block having a first electrode member and a second electrode member each having annular operation bores aligned so as to communicate with each other, the electrode block including an insulator interposed between the first and the second electrode members, and the insulator having a bore aligned with the bores of the first and second electrode members, wherein the electrode block includes a third electrode member between the first electrode member and the second electrode member, and a further insulator so that the adjacent electrode members have one insulator therebetween, the third electrode member having a bore aligned with the bores of the first and second electrode members, inserting an end portion of one tube into the first electrode member and an end portion of the other tube into the second electrode member so that both tube ends are placed in contact with each other in the annular operation bores and applying a high frequency voltage between the first and third electrode members, and between the third and second electrode members.

2. A method according to claim 1, wherein a further tube covers the end portions of the tubes so as to ensure the joint among the three tubes.

* * * * *